United States Patent
McGuire et al.

(10) Patent No.: US 7,328,376 B2
(45) Date of Patent: Feb. 5, 2008

(54) ERROR REPORTING TO DIAGNOSTIC ENGINES BASED ON THEIR DIAGNOSTIC CAPABILITIES

(75) Inventors: Cynthia A. McGuire, San Jose, CA (US); Timothy P. Haley, Boulder, CO (US); Andrew M. Rudoff, Boulder, CO (US); Michael W. Shapiro, San Francisco, CA (US); Matthew T. Simmons, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 524 days.

(21) Appl. No.: 10/698,989

(22) Filed: Oct. 31, 2003

(65) Prior Publication Data

US 2005/0102567 A1    May 12, 2005

(51) Int. Cl.
*G06F 11/00* (2006.01)
*G06F 11/07* (2006.01)

(52) U.S. Cl. .................... 714/48; 714/57; 714/26; 714/25

(58) Field of Classification Search .............. 714/25, 714/26, 48, 57
See application file for complete search history.

(56) References Cited

U.S. PATENT DOCUMENTS

| | | | |
|---|---|---|---|
| 4,922,491 A * | 5/1990 | Coale | 714/26 |
| 6,260,059 B1 * | 7/2001 | Ueno et al. | 709/202 |
| 6,343,236 B1 * | 1/2002 | Gibson et al. | 700/79 |
| 6,487,677 B1 * | 11/2002 | Jantz et al. | 714/2 |
| 6,732,124 B1 * | 5/2004 | Koseki et al. | 707/202 |
| 6,742,141 B1 * | 5/2004 | Miller | 714/26 |
| 7,082,384 B2 * | 7/2006 | Sasaki et al. | 702/184 |
| 2001/0013109 A1 * | 8/2001 | Daimon et al. | 714/57 |
| 2004/0059966 A1 * | 3/2004 | Chan et al. | 714/48 |

FOREIGN PATENT DOCUMENTS

| | | |
|---|---|---|
| EP | 1109101 A2 | 6/2001 |
| WO | WO02/041105 A2 | 5/2002 |
| WO | WO02/041105 A3 | 5/2002 |

OTHER PUBLICATIONS

Wikipeida's Cache Article revision from Oct. 27, 2003 http://en.wikipedia.org/w/index.php?title=Cache&oldie=1754687&printable=yes.*
The Many Faces of Publish/Subscribe by Eugster, Felber, Guerraoui, and Kermarrec Published Jun. 20003 by ACM Press in ACM Computing Surveys vol. 35 Issue 2, pp. 114-131 ISSN: 0360-0300.*
International Search Report (EP) mailed on Jan. 16, 2006.

* cited by examiner

*Primary Examiner*—Gabriel Chu
*Assistant Examiner*—Joseph Schell
(74) *Attorney, Agent, or Firm*—Darby & Darby PC; John W. Branch (57) ABSTRACT

A method, apparatus, and computer program product diagnosing and resolving faults is disclosed. A disclosed fault management architecture includes a fault manager suitable having diagnostic engines and fault correction agents. The diagnostic engines receive error information and identify associated fault possibilities. The fault possibility information is passed to fault correction agents, which diagnose and resolve the associated faults. The architecture uses logs to track the status of error information, the status of fault management exercises, and the fault status of system resources. Additionally, a soft error rate discriminator can be employed to track and resolve soft (correctible) errors in the system. The architecture is extensible allowing additional diagnostic engines and agents to be plugged in to the architecture without interrupting the normal operational flow of the computer system.

24 Claims, 5 Drawing Sheets

ERROR REPORTING TO DIAGNOSTIC ENGINES BASED ON THEIR DIAGNOSTIC CAPABILITIES

BACKGROUND

Over recent years the complexity of computer systems (and in particular, computer networks) has increased considerably, such systems being characterized by the interaction of multiple system entities in providing a variety of different services. One consequence of this is the considerable strain placed on system management resources tasked to keep such systems up and running.

Certain basic fault diagnosis tools have been developed to address these computer system management issues. For example, low-level fault-diagnosis equipment such as protocol analyzers have evolved generally in line with the increasing sophistication of the technologies used for interlinking system entities. Such equipment has often tended only to serve as an aid to a maintenance engineer or system administrator, telling him/her what can be wrong at the particular point under test. Similarly, higher-level network management systems designed to provide an overview of overall system performance by collecting data from all parts of a network. However, such tools have largely been of limited use leaving much of the problem of understanding what is going on to the network supervisor or system administrator.

Existing tools used to diagnose computer system faults suffer from a number of limitations. First, current tools operate at the kernel level of the computer system requiring that the computer system be taken offline in order to discern faults in the computer system. Additionally, virtually all fault diagnosis and fault correction must involve a human element. In other words, the system administrator must become involved for all fault diagnosis and correction. This is inefficient and extremely time consuming. Also, conventional diagnostic tools do not have the capability to collect enough data to determine the nature of a system fault. Commonly, some error information is acquired (with the system offline) and used to provide some rudimentary suggestions concerning a suitable diagnostic tool. At this point the system administrator must review the error information and select an appropriate diagnosis tool. Almost universally, this diagnosis tool will request further system error information, which must then be collected. This new error information is then provided to the diagnosis tool to attempt fault diagnosis. Once a diagnosis is made, the system administrator takes action to correct the fault. The system is then restarted.

SUMMARY

In accordance with the principles of the present invention, methodologies and architecture for improved fault management are disclosed. In general, the embodiments of the invention concern fault management architectures and methods for receiving error information and therefrom diagnosing and resolving faults. Such fault management can be accomplished in an automated manner.

In one embodiment, the invention contemplates a fault management architecture for use in a computer system. The architecture includes a fault manager suitable for interfacing with diagnostic engines and fault correction agents, the fault manager being suitable for receiving error information and passing this information to the diagnostic engines. The architecture includes diagnostic engines for receiving error information and that can identify fault possibilities associated with the error information (fault diagnosis). Additionally, fault correction agents receive the fault possibilities from the diagnostic engines and resolve the associated diagnosed faults. Logs for tracking the status of error information, the status of fault management exercises, and the fault status of resources of the computer system are maintained by the architecture. Additional embodiments employ a soft error rate discriminator to track and resolve soft (correctible) errors in the system. Additionally, embodiments of the architecture are extensible allowing additional diagnostic engines and agents to be plugged in to the architecture without interrupting the normal operational flow of the computer system.

In another embodiment, the invention comprises method for diagnosing and resolving faults in a computer system having a fault management architecture of the present invention. The method involves receiving error information in a fault manager of the computer system and diagnosing a set of fault possibilities associated with the error information. Diagnosed faults associated with the error information are then resolved. All such steps can be accomplished by the computer system.

Another embodiment comprises a computer-readable program product for diagnosing and correcting faults in a computer system having a fault management architecture. The program product configured to cause a computer to implement the computer-controlled steps of receiving error information in a fault manager of the computer system, identifying a set of fault possibilities associated with the error information, diagnosing a fault associated with the error information by selecting from among the set of fault possibilities, and resolving the diagnosed fault.

Another embodiment of the invention is a computer system comprising processors capable of processing computer readable instructions. The system includes a memory capable of storing computer readable information. The computer system includes computer readable instructions enabling the computer system to capture error information from the computer system and generating error reports. The computer system includes computer readable instructions enabling the computer system to analyze the error reports and generate a list of fault possibilities associated with the error reports. The computer system includes computer readable instructions enabling the computer system to determine a probability of occurrence associated with each of the fault possibilities. The computer system includes computer readable instructions enabling the computer system to determine which of the of fault possibilities are likely to have caused the error report and select that as an actionable fault and enable the computer system to resolve the actionable fault. The computer system includes computer readable instructions enabling the computer system to understand that the actionable fault has been resolved.

These and other aspects of the present invention are described in greater detail in the detailed description set forth hereinbelow.

BRIEF DESCRIPTION OF THE DRAWINGS

The following detailed description will be more readily understood in conjunction with the accompanying drawings, in which:

FIG. 3 is a flow diagram illustrating one exemplary method embodiment of a fault management exercise of the present invention.

It is to be understood that, in the drawings, like reference numerals designate like structural elements. Also, it is understood that the depictions in the Figures are not necessarily to scale.

DETAILED DESCRIPTION OF THE DRAWINGS

The present invention has been particularly shown and described with respect to embodiments and specific features thereof. The embodiments set forth herein below are to be taken as illustrative rather than limiting. It should be readily apparent to those of ordinary skill in the art that various changes and modifications in form and detail may be made without departing from the spirit and scope of the invention.

When a computer system encounters a system interrupt (an error) the computer system can begin to function erratically or fail completely. A computer system error is a symptom detected by the computer system in response to a fault (i.e., the underlying problem in the system that caused the error). Typical examples of such errors include commands that time out, bus errors, I/O errors, ECC memory (Error-Correcting Code memory) errors, unexpected software results, and the like. Other errors include the typical 256 software interrupts that are commonly found on interrupt vector tables. Such software interrupts are commonly referred to as traps or exceptions. Other error examples include hardware interrupts (e.g., IRQ line failures etc.). The faults that cause such errors are legion. A few common examples include device failures, bus line failures, disconnected cables, memory failures, and many, many more. It is important that faults causing these errors be identified and corrected as soon as possible to enable efficient system operation.

The embodiments of the present invention go beyond current approaches to fault diagnosis and correction and do not require extensive manual action on the part of the system administrator. The embodiments go beyond approaches that are limited to general error reporting and rudimentary guidance as to which diagnostic tools may be useful in finding the responsible fault. The embodiments of the invention do not always require the system administrator to evaluate errors to determine which diagnostic tools to use next and then acquire further error information in order to diagnose the nature of the fault. The embodiments of the invention can programattically take action to correct faults. The systems and method embodiments of the invention can operate with the system "on-line". This goes beyond existing approaches have no ability to capture data, diagnose faults, and correct faults "on the fly" (while the system is online operating normally). Additionally, embodiments of the present invention are readily extensible. Thus, when new diagnostic tools become available, they can simply be plugged into the system and used. There is no need for the system to be taken offline and no need for the entire messaging sub-scheme to be reconfigured in order to patch in the new tool as is the case with conventional approaches.

The following detailed description describes various method and apparatus embodiments of a fault management architecture used in a computer system. In general, a fault management architecture constructed in accordance with the principles of the invention operates in an automated manner to collect error information, evaluate the error information, and diagnose faults associated with the error information. Additionally, the fault management architecture takes action to resolve the faults. Such resolution can also be automated. Embodiments of the fault management architecture operate at the user level of the operating system (O/S) and not at the kernel level and so do not require that the system be taken offline in order to operate. In fact, the fault management architecture of the present invention can be continuously operating whenever the system is operating. Moreover, the fault management architecture can be readily updated with improved features without taking the system offline. For example, new or updated diagnostic engines 102 and fault correction agents 103 can be added to (or removed from) the system while the computer system is operating without interfering with the normal operation of the computer system.

For purposes of this disclosure there is a user level and a kernel level. System and end-user application software runs at the "user-level". Additionally, there is a kernel level. As is known to those having ordinary skill in the art, the kernel is a special program that manages system resources (e.g., software and hardware). The kernel insulates applications from system hardware while providing them with controlled access to hardware and essential system services including, but not limited to I/O management, virtual memory, and scheduling.

Figure 1:
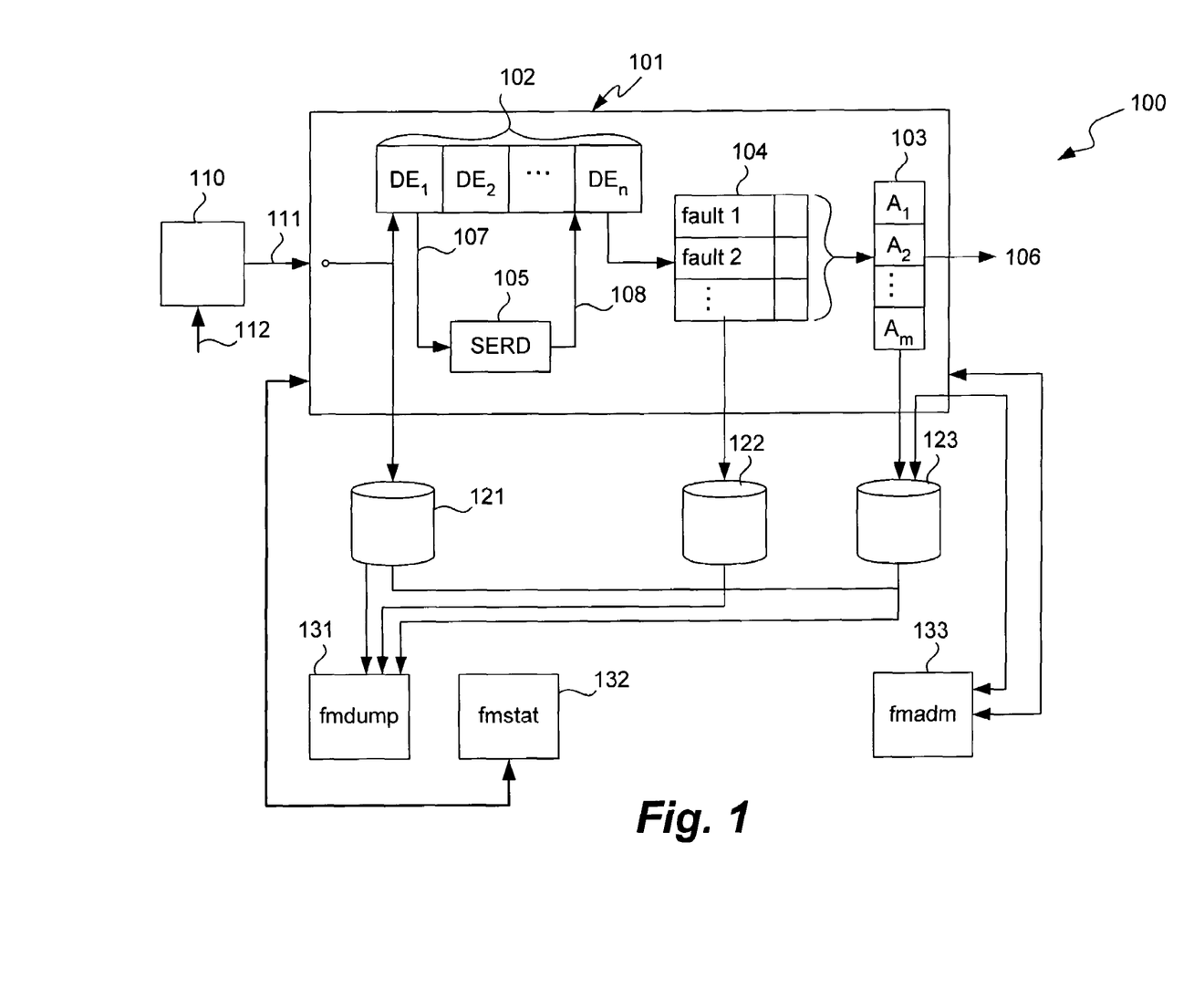
FIG. 1 is a simplified block diagram illustrating a fault management architecture embodiment in accordance with the principles of the invention.

FIG. 1 depicts one example of a suitable fault management architecture constructed in accordance with the principles of the invention. In the depicted embodiment, the fault management architecture 100 operates in a computer system at the user level. The advantage of operating at the user level means that the operation of the fault management architecture does not interfere with the operation of the kernel. Thus, the computer system can operate effectively at the same time the fault management architecture is operating. The fault management architecture includes a fault manager 101, which includes a plurality of diagnostic engines 102 (e.g., $DE_1, DE_2, \ldots DE_n$) and a plurality of fault correction agents 103 (e.g., $A_1, A_2, \ldots A_m$). The fault manager 101 can optionally include a soft error rate discriminator (SERD) 105 whose function and utility will be explained in greater detail hereinbelow. The fault management architecture 100 also includes a data capture engine 110. In some embodiments, the data capture engine 110 can optionally be included as part of the fault manager 101 itself. Another advantage of operating the fault management architecture at the user level is that the diagnostic engines 102 and the fault correction agents 103 can be plugged into (or unplugged from) the computer system without interfering normal system operation. The process of capturing data through fault diagnosis and resolution is referred to as a fault management exercise. Processes and methods for facilitating such fault management exercises are described in greater detail elsewhere herein.

Referring again to FIG. 1, the data capture engine 110 is a set of computer readable program instructions for receiving and processing error information from the computer system. For example, the data capture engine 110 can capture error information in many different software components (and resources) including, but not limited to, a kernel module, device drivers, trap handlers, interrupt handlers, and user-level applications. The data capture engine 110 passes this error information to the fault manager 101 for further processing. The data capture engine 110 operates above the kernel level (e.g., at the user level) to acquire error information from the system. This means that operation of the data capture engine 110 does not interfere with the normal operation of the O/S. The data capture engine 110 receives error information 112 (e.g., hardware interrupts, software interrupts, and the like) from the system and generates error reports 111 that are forwarded to the fault manager 101. This can be done, for example, using a publish-subscribe protocol of a type known to those having ordinary skill in the art. The fault manager 101 being a subscriber to the error reports 111 generated by the data capture engine 110.

In one embodiment, the data capture engine 110 captures error information. The information is formatted as an error message 111 (also referred to as e-report messages or error report messages). The error message 111 is output from the data capture engine 110 where it can be received by the fault manager 101. In one implementation, the error message 111 is formatted in accordance with a fault management protocol so that certain information is contained within the error message 111. For example, in one suitable protocol, the error message 111 includes an error class name, an error numeric association, the name(s) of the error detectors, and detector specific data.

Once the fault manager receives an error report 111 from the data capture engine 110 it assigns an identification (ID) number to the error report 111. Commonly, the fault manager 101 includes a dispatcher that publishes the error report 111. Interested diagnostic engines 102 also receive the error report 111. Additionally, the fault manager 101 sends error report 111 to the error report log 121 or any other subscribing services. Data transmission of the error report 111 to the fault manager 101 and the interested diagnostic engines 102 can conveniently be accomplished using publish-subscribe protocols well known in the art. In such a publish-subscribe implementation, the dispatcher in the fault manager 101 initiates a publish event for each error report 111. Diagnostic engines 102 that are interested in certain types of error reports subscribe to the reports. Generally, interested diagnostic engines 102 are those having diagnostic algorithms and processes capable of analyzing and diagnosing specific types of error reports to determine a fault. Each type of diagnostic engine 102 has a particular "expertise" and is thus a preferred tool for diagnosing certain types of errors. Thus, when an error report 111 is published, subscribing diagnostic engines 102 (for example, $DE_1$) receive the error report 111. If no diagnostic engine 102 takes an interest in the error report 111, it is listed as and unhandled error fault and can be addressed by the system administrator if required. Additionally, the data capture engine 110 sends error reports 111 to an error report log 121 which stores all the information in the error report 111. In addition to the error report 111, the error report log 121 receives information on the state of the error report 111 (this is described in greater detail hereinbelow with respect to the operation of diagnostic engines). The data in the error report log 121 can be called up at the request of a user to, for example, review the acquired data concerning the reported errors. Such a feature has tremendous utility during fault diagnosis, especially when the computer system goes down and must be restarted. Under such circumstances the log can be called up and reviewed and the information contained therein can be used for fault diagnosis.

The disclosed embodiment utilizes publish-subscribe protocols to communicate error messages in the fault management architecture 100. However, as can be appreciated by those having ordinary skill in the art, in addition to publish-subscribe protocols, many other methods of data transmission can be used to transmit the error reports 111 to the fault manager 101 (in particular, the diagnostic engines 102) as well as to the error report log 121.

In continuation, diagnostic engines 102 (e.g., $DE_1$, $DE_2$, . . . $DE_n$) are an important feature of the depicted fault management architecture 100. Each diagnostic engine receives error information (e.g., error reports) and identifies a set of fault possibilities associated with the errors contained in the error information. A fault possibility is defined as a potential fault that can result from a given set of error messages. In particular, the diagnostic engines 102 receive error events (e.g., error reports) and generate a set of corresponding fault possibilities. This set of fault possibilities can also be thought of as a list of suspected faults (list of suspects 104). This list of suspects 104 is provided to a set of fault correction agents 103 which can take corrective actions to remedy the fault. Additionally, this list of suspects 104 is provided to and stored in a fault management exercise log (fme log) 122. The fme log 122 also stores other information relevant to the state of the fault management exercise. Such other information will be detailed elsewhere in this disclosure.

Interested diagnostic engines 102 receive error reports 111 for error report types that they have subscribed to. The diagnostic engines 102 then assess and analyze the error reports 111 to generate a list of suspects 104 that includes a set of fault possibilities. The fault possibilities are potential causes of the error reports 111. The diagnostic engines 102 run through sets of computer readable instructions for analyzing error information to generate the list of suspects 104. If a diagnostic engine 102 does not have enough information to generate a list of suspects 104 it will continue to wait for further error reports 111 until such time as the diagnostic engine 102 does have enough information to generate a list of suspects 104. Generating the list of suspects 104 is commonly referred to as diagnosing the fault.

The fault possibilities found on lists of suspects 104 can include the entire range of computer related occurrences. Everything from loose components, disconnected cables, damaged components, to software errors and more can be included in a list of suspects 104. In one embodiment, the list of suspects 104 also includes an estimation of fault certainty. Where more than one type of fault possibility is generated, the estimate of certainty is helpful in discerning the actual cause of the error reports. Such certainty estimates can be generated using a number of approaches. However, in one implementation certainty estimates can be generated based on a "fit rate" of the faulty resource. This fit rate can be based on the statistical rate of failure of a system resource (e.g., hardware component or software element) in the field. For example, if the list of suspects includes fault 1=a cable failure and fault 2=a disk failure, an analysis of the fit rate can provide a certainty measurement. For example, if the failure rate in the field for the cable is four times as high as the failure rate for the disk. The list of suspects can include a certainty estimate for the two faults. For example, fault 1:80% certainty; fault 2:20% certainty. Other measures of certainty can also be implemented for use with the diagnostic engines 102.

This list of suspects 104, as well as the error reports used to generate it, is sent to the fme log 122 where it is stored along with the current state of the fault management exercise (explained in greater detail hereinbelow). Additionally, the list of suspects 104 (as well as any certainty information contained therein) is published in the fault manager 101. Interested fault correction agents 103, receive the list of suspects 104. Generally, interested fault correction agents 103 are those having fault correction algorithms and processes capable of analyzing and correcting certain types of faults. Again, each fault correction agents 103 has a particular "expertise" and is thus a preferred tool for acting upon certain types of faults. Thus, when a list of suspects 104 is published, subscribing fault correction agents 103 (for example, $A_1, A_2, \ldots A_m$) receive the list 104.

Fault correction agents 103 ($A_1, A_2, \ldots A_m$) include a computer readable set of instructions capable of evaluating the fault possibilities of a list of suspects 104 and initiating an action 106 in response to the list of suspects 104. The fault correction agents 103 resolve the faults. Such fault resolution can include, but is not limited to, the initiation of corrective action to remedy faults or providing messages that enable a user (e.g., system administrator) to initiate manual corrective action. For example, the fault correction agents 103 can deconfigure components, take components offline, reconfigure software faults, or provide messages to the user enabling to replace or reconfigure components. Some typical examples of such actions are described as follows. Where a memory DIMM is faulted, the agent 103 can retire the page from the system. Where I/O device is faulted, the agent 103 can force detach the driver and/or deconfigure the device. Where the CPU is faulted, the agent 103 can disable the CPU. Where a software service becomes faulted, the agent 103 can restart the service. Moreover, these system corrections can be maintained once the system is rebooted or reset. The inventors specifically point out, that the above examples are illustrations only, and that the inventors contemplate a vast range of other corrective actions can be taken by the agents 103. Additionally, the fault correction agents 103 can initiate a number of other corrective steps known to those having ordinary skill in the art.

Agents 103 can use a number of tools to discern the probable fault in a system. For one, they can utilize the certainty estimate provided by the diagnostic engines 102. For example, if fault 1 has a corresponding 80% certainty and fault 2 and fault 3 are 15% and 5% respectively, the agent 103 will most likely act on fault 1. However, the agents 103 are programmed with additional parameters to discern fault priority. For example, a history parameter can be used to identify the most likely causative fault. If an analysis of the diagnosed faults (from the list of suspects 104) reveals that one fault has a statistically greater likelihood of occurring than another fault (either in this system or in all systems) the agent can use this information to correct (or otherwise resolve) the most likely fault. Thus, the history parameter can be used to discriminate between several potential faults to identify the most likely cause first. In another example, a system management policy parameter can be used to identify a higher probability fault. The system maintains a record of all corrective actions taken on faults in the past (e.g., the ASRU log 123 discussed herein below). A system management policy parameter can be used to specify that newly repaired faults are unlikely to be the most probable fault in any subsequent error events. So, for example, if a set of error reports identifies a cable failure (fault 1) being a most likely cause of the errors and a memory failure a second most likely cause of failure (fault 2), and the system just had the relevant cable newly replaced, the system management policy parameter could be used to preferentially select correction of the memory failure (fault 2) by the agent 103. Thus, the system management policy parameter can be used to discriminate between several potential faults to identify the most likely cause first.

Once such action 106 is initiated by the fault correction agent 103, a message concerning the action 106 is sent to a resource cache 123. The resource cache 123 includes a listing of all resources of the computer system that have had fault management exercise performed on them. As used herein, "resources" refer to software and hardware components of the system. The information posted to the resource cache 123 is referred to as ASRU (Automatic System Recovery Unit) data. It is for this reason that the resource cache 123 is also referred to as the ASRU log. It is called ASRU data because in the event the system goes offline (frequently the case for bad errors), upon restart this log 123 is accessed to reestablish the "state" of the system resources (e.g., system components) and the state of fault management exercises and also the state of error reports. The information in the ASRU log 123 includes the most updated "state" of the resource in question and a history of fault management exercise identifiers (fme ID's) associated with the resource in question. From the fme ID's, a listing of error reports that lead to the fault diagnosis, the suspect list 104 associated with the fault diagnosis of that resource can be associated from the error log and fme log. Each entry in the ASRU log 123 includes an ASRU ID number that is used to identify and track each event. The user can access any given component in the system and call up all the ASRU ID numbers associated with that component and obtain a clear picture of that components fault history and current status.

An additional optional feature that is not required to practice the invention but forms part of some embodiments is a soft error rate discriminator (SERD) 105. The SERD 105 is used to analyze certain types of faults and not immediately declare components "bad" and in need of immediate replacement. The SERD is used to discriminate between soft errors and non-correctible fatal errors. In general "soft errors" are recoverable errors. For example, one type of soft error is a "correctible error". A correctible error is one that can be physically corrected by the hardware. For example, a single-bit ECC memory error can be corrected without impacting the system software. Another type of soft error is a recoverable error such as a recoverable disk error. For example, if a disk fails a first time, but then repeats the process and is able to execute the process correctly without a disk failure, this is a recoverable error and another type of soft error. If such correctible errors occur infrequently, they are not generally cause for alarm, and do not require wholesale component replacement to correct the problem. However, if too many of these correctible errors occur in too short a period of time it may indicate that certain components are faulted. The SERD 105 is a tool for making this distinction. The SERD 105 receives fault information (list of suspects 104) for certain types of fault diagnosis (i.e., faults caused by soft errors e.g., correctible errors) from the diagnostic engines 102. If the SERD 105 receives too many of a given category of errors within a given time interval, the SERD 105 will generate a soft error message that is provided to the diagnostic engines 102. This message is sometimes referred to as a recurrent soft error message. Once the diagnostic engines 102 receive the soft error message from the SERD 105 the diagnostic engines will generate a suspect list containing a fault corresponding to the soft error message. The processing of this soft error message is the same as described earlier for the non-correctible errors. The SERD 105 typically includes parameters for tracking the type, amount, and frequency of correctible errors. For example, a number parameter can be used to track each occurrence of a given type of correctable error. A time threshold parameter can be set to determine the frequency of occurrence for each type of correctible error. Each of these can be adjusted to accommodate the needs of the system and user. For example, using correctible memory errors as the type of error, the SERD can be set with a threshold at five correctible memory errors in five seconds. Thus, a certain rate of correctible memory errors will not initiate an action by the fault manager. However, when the SERD receives a sixth correctible memory error 107 within five seconds a soft error message 108 is sent to the diagnostic engines 102 which in turn produce a list of suspects 104 associated with the soft error message 108 that is sent to the fme log 122 and to the agents 103 for action. This soft error message 108 is also called a recurrent soft error message or a recurrent correctible error message. The agents act on the suspect list containing a fault corresponding to the soft error message 108 just as they would any other list of suspects 104 to produce an appropriate action. In general, when the SERD 105 threshold is reached the diagnosis will produce a suspect list having one fault.

Additionally, the depicted embodiment includes several other useful (but optional) system management tools (131, 132, 133). An fmdump file 131 serves as a repository for all the accumulated logs (121, 122, 123). As such this file 131 has several useful purposes. For one, the file can be downloaded and used to perform analysis on the diagnostic engines 102 and agents 103. The file can be sent to any location (e.g., a diagnostic tool manufacturer) for analysis. Using the acquired information the diagnostic tools can be tested for accuracy and efficacy in correctly diagnosing the faults. In another application, the accumulated information can be played back to obtain added diagnostic information. For example, if a new diagnostic engine is added, the fmdump file 131 can be played back using the new diagnostic engine to diagnose other possible fault possibilities. Embodiments of the fmdump file 131 are used as a fault manager application tool that can be used to, among other things, display and format the contents of the error report log 121 and the fme log 122.

An fmstat file 132 can be used to accumulate statistical data that can later be used to, for example, debug the fault manager 101. The fmstat file 132 can be used to monitor errors and statistical trends within the fault manager 101.

The fmadm tool 133 can operate as a fault management tool that provides services including, but not limited to: starting or stopping the fault manager 101; loading or unloading diagnostic engines 102; starting or stopping the agent software 103; displaying and updating the contents of the ASRU log 123. The fmadm tool 133 is also an effective administrative query tool. For example, the fmadm tool 133 can be used to access the ASRU log 123 to query on the system status. It can be used to determine, for example, what components of the system are faulted. It can be used to, for example, given a specific faulted resource or ASRU ID number, query as to what errors, list of suspects, led to the diagnosis of faulted for that resource.

Although the invention has been described in terms of a single computer, the fault management architecture and methods of the present invention can be readily used in networked computer systems having many computers devices linked together over a communications link. The communications link may be through the Internet, an intranet, a LAN, a WAN, or other network-type system designed to allow computer equipment to share data in a bidirectional manner. The fault management architecture can run on one node of a network having a plurality of nodes, while managing errors and faults on another node of the network. In such networks, a node comprises generally, a processing location. A node can be a computer or some other device, such as a printer. Typically, each node has a unique network address, sometimes called a Data Link Control (DLC) address or Media Access Control (MAC) address. The fault management architecture embodiments of the invention can be mounted at one node in a network and still manage faults and errors on the other nodes of the network.

Figure 2:
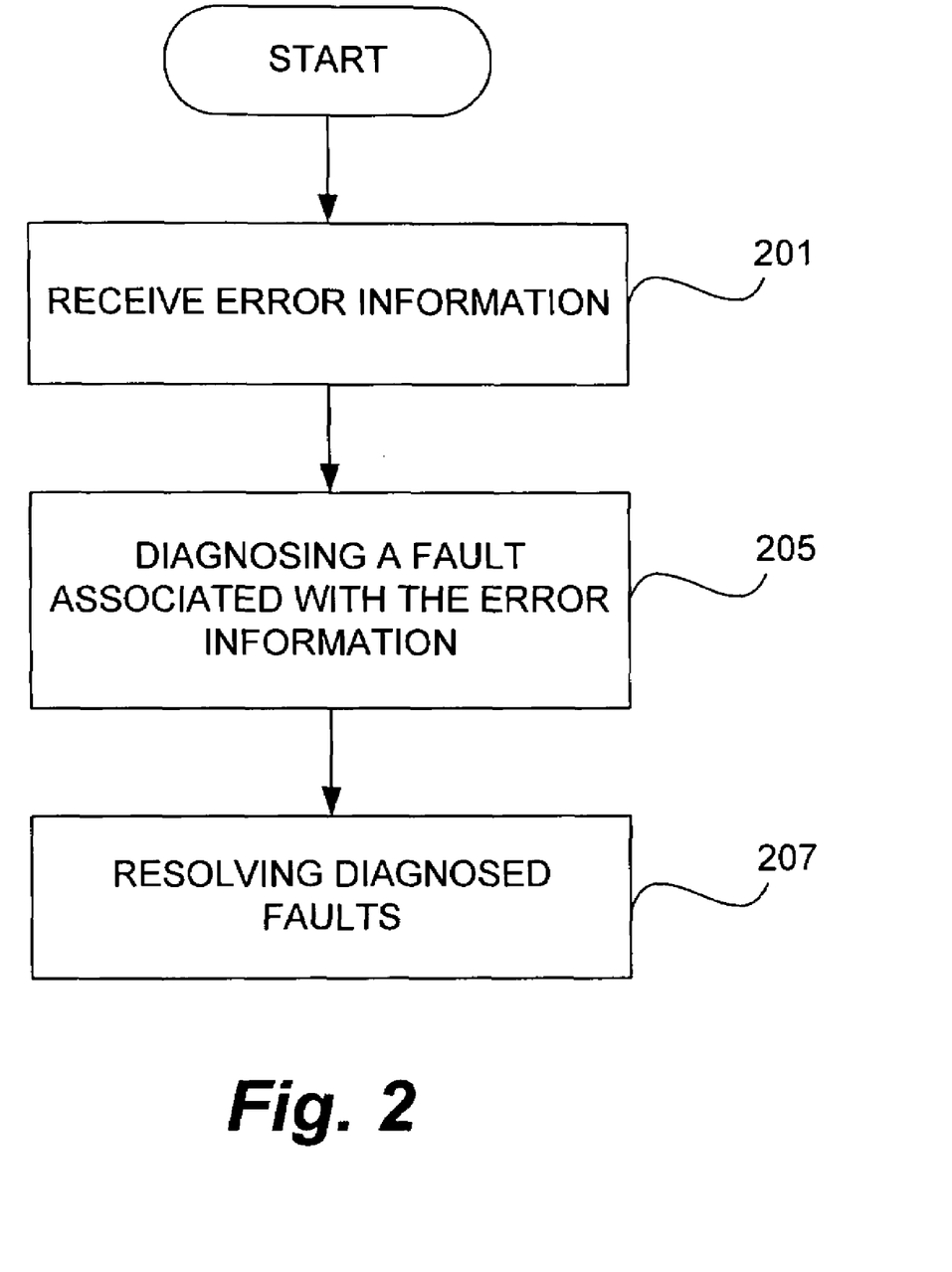
FIG. 2 is a flow diagram illustrating one simplified exemplary method embodiment of the present invention.

FIG. 2 is a flow diagram illustrating one exemplary method 200 embodiment of the present invention. The method 200 begins by receiving error information in a fault manager 101 of the computer system (Step 201). Typically, such error information is sent in the form of error messages 111 from a data capture engine 110 (which may or may not form part of the a fault manager 101). In one implementation the data capture engine 110 collects error data in accordance with a set of computer readable instructions configured for accomplishing such error information. Then the data capture engine 110 transmits the error data to the fault manager (e.g. the diagnostic engines 102) in accordance with a set of computer readable instructions configured for accomplishing task. In one implementation, the data capture engine 110 captures enough error information to enable a diagnosis of a fault to be made without any additional information to be gathered.

In continuation, the diagnostic engines 102 diagnose the fault (Step 205). Where the diagnosed fault comprises more than one fault, a set of fault possibilities associated with the error information is identified by the diagnostic engines 102. In one implementation the identifying is accomplished by the computer system executing a set of computer readable instructions configured for accomplishing such identification. Typically, the diagnostic engines 102 receive the error information and generate a list of suspects 104 in accordance with a set of computer readable instructions configured for accomplishing such suspect list generation. Such fault suspects comprise a list of fault possibilities associated with the error information. This list of suspects 104 can also include certainty information.

Finally, a fault resolution is initiated (Step 207). Such resolution is typically accomplished by selecting from among a set of fault possibilities. In one implementation, resolution is accomplished by the computer system executing a set of computer readable instructions configured for accomplishing such resolution. Typically, the resolution is begun with the diagnostic engines 102 providing a list of suspects 104 and the fault correction agents 103 completing the choosing a fault to act on in accordance with a set of computer readable instructions configured for accomplishing such activity. In one implementation, fault correction includes an analysis of at least one of computer component failure history (as described above), system management policy (as described above), and relative probability of occurrence for each fault possibility (certainty). Once a selected fault is identified, corrective action (or some other resolution) can be implemented to remedy the fault. Such fault resolution is implemented by fault correction agents 103 and can include, but is not limited to software correction of the fault (e.g., taking the faulted component offline), software compensation for the fault (e.g., identifying the component as degraded but still usable or routing around the faulted component). Additionally, fault resolution can include generating a fault message that can be used to identify the fault and to take further action. Such fault resolution is accomplished by the computer system in accordance with a set of computer readable instructions configured for such fault resolution.

Also, embodiments of the invention can be used to maintain and update system logs concerning error messages and fault management. Such methods can include, but are not limited to updating error logs to track each new error, updating fault management exercise logs to track the current status of fault managements exercises (including, but not limited to the tracking of fault identification and fault diagnosis), and updating a resource log to track the current fault status and complete fault history of components of the computer system. Embodiments of the invention are configured to, if the computer system shuts down due to an error, restarting the system and recalling the logs to track the fault status and fault history of components of the computer system and thereby diagnose a faulted component and then, based on this reconstructed information, correct the faulted components.

FIG. 3 is a simplified flow diagram that illustrates aspects of a sample fault management exercise in accordance with the principles of the invention. A fault management exercise 300 is a process that follows the process of fault management from initial error to fault resolution.

The fault management exercise 300 with the system generating an error report 111 corresponding to some event in the computer system (Step 301). Referring to FIG. 1 this error report 111 is generated by a data capture engine 110. When the error report 111 is generated it is assigned an error report ID number enabling it to be tracked. This error report 111 is then forwarded to the fault manager 101 where it is received by the fault manager 101 (Step 303). Additionally, the fault manager 101 forwards the error report 111 to the error report log 121 where it is listed as "received" (Step 305). The error report "state" is tracked by the error report log 121. The report "state" can include "received", "waiting", "diagnosed" and "discarded". Received means that the error report 111 has been received by the fault manager 101. Waiting means that the error report 111 has is not yet diagnosed by the fault manager and is awaiting further information (generally in the form of additional error reports) before a change of state can be entered. Diagnosed means that the error report 111 has been diagnosed as having been caused by a fault. Discarded means that the error report 111 has been received by the fault manager 101 and determined to have been deficient in some manner (e.g., wrong format, corrupted data, bad register values, or some other defect rendering the data unusable in one form or another).

Once the error report 111 has been received by the fault manager 101 it is dispatched to the diagnostic engines 102 (Step 307). The subscribing diagnostic engines 102 receive the error report 111. Then the diagnostic engines 102 determine whether the error report 111 is valid (Step 309). If the diagnostic engines 102 determine that the error report 111 is bad or deficient in some manner (e.g., wrong format, corrupted data, bad register values, or some other defect rendering the data unusable in one form or another) the error report 111 is discarded. Additionally, the error report log 121 is updated to reflect that the error report 111 is invalid and the state for that error report is changed to "discarded". Where the diagnostic engines 102 accept the error report 111 as valid it is determined whether the error report 111 is part of an already activated fault management exercise (Step 311). If the error report 111 is not part of an existing fault management exercise the error report initiates a new fault management exercise (Step 312) and will be treated similarly to that which will be discussed with respect to Step 319 (discussed herein below). If the error report 111 does form part of an existing fault management exercise (i.e., diagnostic engines are already attempting to diagnose a fault when the error message is received) then a determination is made as to whether the existing fault management exercise is in a diagnosed state (Step 313). Where it is determined that the fault management exercise is diagnosed, various logs are updated. A message is sent to the error report log 121 identifying the error report as belonging to a diagnosed fault management exercise (Step 315). This state of the error message is updated reflect a change of state to a "diagnosed" status. Additionally, the fault management exercise log (fme log) 122 is updated and the state is changed to "diagnosed" (Step 317). In addition the fme log 122 is updated to include a list of suspects 104 used to make the diagnosis as well as a list of the error messages used to generate the list of suspects 104.

It should be pointed out that the state of the fault management exercise can be tracked using the fme log 122. The states include "active", "diagnosed", "retire", and "closed". Active means that the fault management exercise is still in process and ongoing. Diagnosed means that the fault management exercise has diagnosed the fault and is still in process (perhaps gathering additional data or not yet having resolved the fault). Retire means that the fault management exercise has diagnosed the fault and has resolved the fault (e.g., by some sort of corrective act by the agents 103 or sending a message requiring further action by the user). Closed means that the fault management exercise has diagnosed the fault and has corrected the fault permanently (e.g., the faulted component has been replaced). Closed entries will not be replayed upon restart of the system or restart of the fault manager daemon. Additionally, the state information in the fme log 122 can be augmented with suspect lists 104 leading to diagnosis and the associated error reports 111 that lead to the generation of the suspect lists 104 by the diagnostic engines 102.

Returning to Step 313, where the fault management exercise is not diagnosed, the error report 111 is added to the fault management exercise (Step 319). This means that the error report log 121 is updated (Step 321) and the state of the error report is changed to "waiting". Additionally, it is determined if the diagnostic engines 102 can diagnose the fault based on the latest piece of error information (error message) (Step 323). Where the further information provided by the latest error message 111 still does not enable the diagnostic engines 102 to diagnose the fault, the process returns to Step 301 where the generation of further error reports is awaited. This feature allows the fault management architecture of the present invention to continue to collect error information (e.g., error messages) until enough data is collected to enable a fault diagnosis. This enables the fault management architecture to collect all the needed error information at one time without needing to continually collect information, test if a diagnosis can be made, and collect still more information.

In continuation from Step 323, once it is determined that a diagnosis can be made, the diagnostic engines generate sets of fault possibilities (list of suspects 104) (Step 325). Additionally, the list of suspects 104 can be supplemented with certainty estimations (which have already been explained herein above). The list of suspects 104 is then posted to the fme log 122 (Step 327). Also, the error log 121 is updated to reflect that the error message now corresponds to a diagnosed fault (i.e., the state is changed to "diagnosed") (Step 327). Additionally, all "waiting" error reports concerning the same diagnosed fault are updated to reflect that the fault has been diagnosed (i.e., the state of these error reports is changed to "diagnosed").

The fault management exercise then passes the list of suspects 104 to the agents 103 for fault resolution (Step 329). The agents then take action to resolve the fault(s) (Step 331). The faulted component can be taken offline or deconfigured and additionally messages can be sent to the user that additional action should be taken. Then the logs are updated to reflect the action taken by the agent (Step 333). For example, where a faulted component is diagnosed as requiring replacement and is replaced, the fme log 122 is updated to a "closed" state. Also, where the fault management exercise concludes with a message to the user (e.g., requesting that the user take some manual action), the fme log 122 can updated to a "retire" state, which means the fault has been identified and action has been taken (although the action may not remedy the fault). When the system (or fault manager) is restarted a "retired" fault management exercise will be replayed (since it ostensibly may not corrected yet) and a "closed" fault management exercise will not be replayed (since the fault has been corrected, possibly through component replacement). Additionally, the ASRU log 123 is updated with the fault status of the components in question.

This means that the fault status of components (or other resources) can be tracked using the ASRU log 123. Resource states include "OK", "faulted", "degraded", and "unknown". "OK" means that the resource is not faulted and operational. This state change commonly occurs when a resource has previously been diagnosed as faulted and is no longer deemed faulted (e.g., the component has been fixed or replaced or the initial diagnosis was incorrect and has now been corrected). "Faulted" means that the resource has been deemed faulted and needs some corrective action taken. This "faulted" state can include the list of suspects 104 used to diagnose the fault, a list of error reports used to generate the list of suspects 104. Also, the "faulted" state can include an fme number that references the entry in the fme log 122 corresponding to the diagnosis of a faulted state. Other information concerning the diagnosis of the faulted state can also be tracked in the ASRU log 123. "Degraded" means that the resource is faulted but usable at some degraded level of functionality. Information concerning the level of functionality can also be included with the "degraded" state. Additionally, the "degraded" state can include the list of suspects 104 used to diagnose the degraded state, a list of error reports used to generate the list of suspects 104. Also, the "degraded" state can include an fme number that references the entry in the fme log 122 corresponding to the diagnosis of the "degraded" state. Other information concerning the diagnosis of the "degraded" state can also be tracked in the ASRU log 123. "Unknown" means that the resource is unusable, but not faulted (at least not that the current fault management architecture can detect). For all states, if desired, the ASRU log can be set up to track the list of suspects 104 used to component analysis, the list of error reports used to generate the list of suspects 104. Also, the fme number that references the entry in the fme log 122 corresponding to each state can be maintained in the ASRU log 123. Alternatively, only the reference error log ID numbers and fme ID numbers can be stored in the ASRU log, allowing the ASRU log to call up the needed information by reference to the other logs.

Figure 4A:
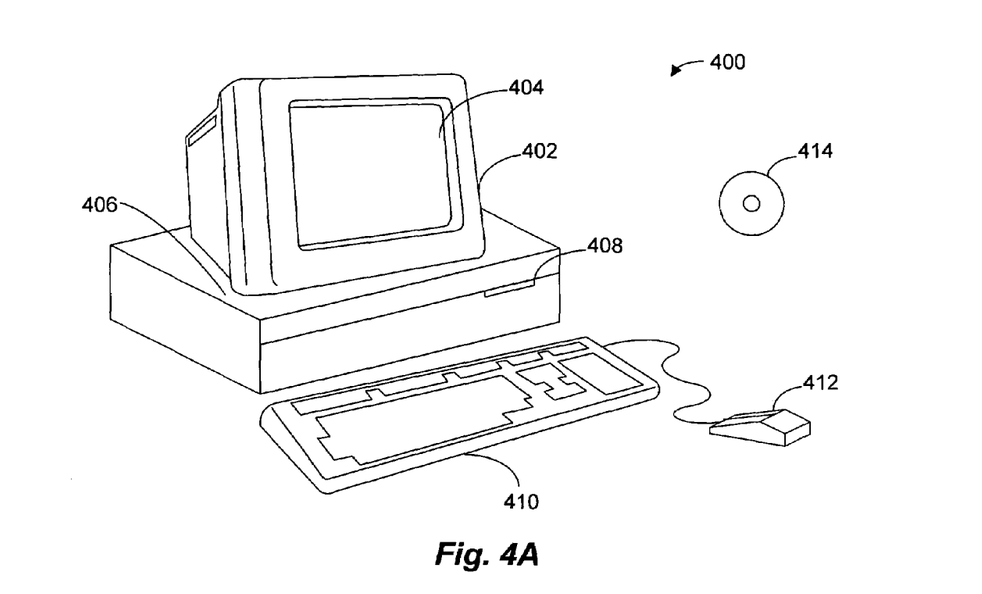
FIGS. 4A and 4B illustrate an embodiment of a computer system suitable for implementing embodiments of the present invention.
Figure 4B:
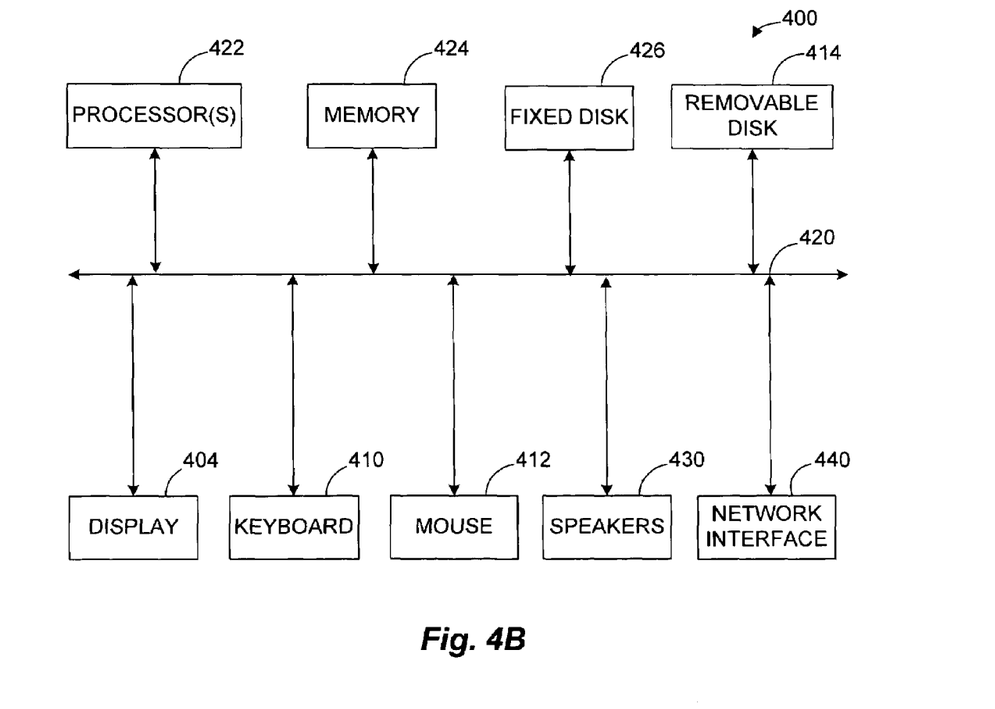

FIGS. 4A and 4B illustrate one example of a computer system 400, suitable for implementing embodiments of the present invention. It is to be pointed out that the computer system 400 can operate as a stand alone computer system or part of the network 10. Additionally, the fault management architecture of the present invention can operate on a distributed computer system having many computers. FIG. 4A shows one possible physical form of the computer system. Computer systems can take many physical forms ranging from an integrated circuit, a printed circuit board, and a small handheld device up to a huge super computer. Additionally, computer systems are intended to apply to networked computer systems having many individual computers. Such networked systems can include local area networks (LAN's) or a wide area network (WAN's). An example of a LAN is a private network used by a mid-sized company with a building complex. Publicly accessible WAN's include, but are not limited to, the Internet, cellular telephone network, satellite systems and plain-old-telephone systems (POTS). Examples of private WAN's include those used by multi-national corporations for their internal information system needs. The network may also be a combination of private and/or public LANs and/or WANs.

An individual computer system 400 includes a monitor 402, a display 404, a housing 406, a disk drive 408, a keyboard 410, and a mouse 412. Disk 414 is a computer-readable medium used to transfer data to and from computer system 400.

FIG. 4B is an example of a block diagram for computer system 400. Attached to system bus 420 are a wide variety of subsystems. Processor(s) 422 (also referred to as central processing units, or CPUs) are coupled to storage devices, including memory 424. Memory 424 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 426 is also coupled bi-directionally to CPU 422; it provides additional data storage capacity and may also include any of the computer-readable media described below. Fixed disk 426 may be used to store programs, data, and the like and is typically a secondary storage medium (such as a hard disk) that is slower than primary storage. It will be appreciated that the information retained within fixed disk 426 may, in appropriate cases, be incorporated in standard fashion as virtual memory in memory 424. Removable disk 414 may take the form of any of the computer-readable media described below. The inventors specifically contemplate that components or resources of the computer system 400 can be located remotely and accessed via a network.

CPU 422 is also coupled to a variety of input/output devices, such as display 404, keyboard 410, mouse 412 and speakers 430. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 422 optionally may be coupled to another computer or telecommunications network using network interface 440. With such a network interface, CPU's receive information from the network, and are capable of outputting information to the network in the course of performing the above-described method steps. Furthermore, method embodiments of the present invention may execute solely upon CPU 422 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

The present invention has been particularly shown and described with respect to certain embodiments and specific features thereof. However, it should be noted that the above-described embodiments are intended to describe the principles of the invention, not limit its scope. Therefore, as is readily apparent to those of ordinary skill in the art, various changes and modifications in form and detail may be made without departing from the spirit and scope of the invention as set forth in the appended claims. Other embodiments and variations to the depicted embodiments will be apparent to those skilled in the art and may be made without departing from the spirit and scope of the invention as defined in the following claims. Further, reference in the claims to an element in the singular is not intended to mean "one and only one" unless explicitly stated, but rather, "one or more".

We claim:

1. A computer network system having a fault management architecture configured for use in a computer network system, the computer network system comprising:
    a plurality of nodes interconnected in a network; and
    a fault manager mounted at a node on the network and configured to diagnose and resolve faults occurring at said node, wherein the fault manager is suitable for interfacing with diagnostic engines and fault correction agents, the fault manager being suitable for receiving error information and passing this information to diagnostic engines that have subscribed to receive the error information, and wherein the fault manager publishes error reports; and wherein each diagnostic engine subscribes to selected error reports associated with fault diagnosis capabilities of said diagnostic engine so that when the fault manager publishes error reports only subscribing diagnostic engines receive the selected error reports;
    at least one diagnostic engine for receiving error information and identifying a set of fault possibilities associated with errors contained in the error information;
    at least one fault correction agent for receiving the set of fault possibilities from the at least one diagnostic engine and then selecting a diagnosed fault, and then taking appropriate fault resolution action concerning the selected diagnosed fault; and logs for tracking a status of the error information, a status of the fault management exercises, and a fault status of the resources of the computer system.

2. The fault management architecture of claim 1 wherein the fault manager is configured to accommodate additional diagnostic engines and fault correction agents that can be added at a later time.

3. The fault management architecture of claim 2 wherein the fault manager is configured so that said additional diagnostic engines and additional fault correction agents can be added while the computer system is operating without interrupting its operation.

4. The fault management architecture of claim 1 wherein the fault correction agents resolve faults by initiating at least one of: executing a corrective action on a selected diagnosed fault and generating a message identifying the selected diagnosed fault so that further action can be taken.

5. The fault management architecture of claim 4 wherein generating a message identifying the selected diagnosed fault so that further action can be taken includes identifying faulted resource and identifying a problem with the faulted resource.

6. The fault management architecture of claim 1 wherein the architecture further includes a data capture engine configured to obtain error information from the computer system and generate an error report that is provided to the fault manager.

7. The fault management architecture of claim 6 wherein the diagnostic engines and the agents are configured so that the fault manager continuously accumulates error reports from the data capture engine until enough error information is accumulated so that the diagnostic engines and the agents can successfully diagnose a fault associated with the error reports.

8. The fault management architecture of claim 6 wherein the fault manager stores the error reports generated by the data capture engine to an error report log of the logs;
    wherein the at least one diagnostic engine stores fault management exercise information in a fault management exercise log of the logs; and
    wherein the at least one fault correction agent stores fault status information concerning resources of the computer system in a resource cache of the logs.

9. The fault management architecture of claim 8 wherein information from the error report log and the fault management exercise log are stored in the resource cache.

10. The fault management architecture of claim 9 wherein resource cache is configured so that in the event of a computer system failure, the system can be restarted and information can be downloaded from the resource cache to reconstruct error history, fault management exercise history, and resource status, and use this information to conduct fault diagnosis.

11. The fault management architecture of claim 9 wherein resource cache is configured so that in the event of a computer system failure, the system can be restarted and information can be uploaded from the resource cache, the error report log, and
    the fault management exercise log is to reconstruct error history, fault management exercise history, and resource status, and use this information to conduct fault diagnosis.

12. The fault management architecture of claim 1 wherein the diagnostic engine determines a probability of occurrence associated with each identified fault possibility.

13. The fault management architecture of claim 12 wherein the at least one fault correction agent for receiving the set of fault possibilities receives a relative probability of occurrence associated with each identified fault possibility from the diagnostic engines and then resolves a fault using a protocol.

14. The fault management architecture of claim 13 wherein the at least one fault correction agent resolves a set of fault possibilities using a protocol that incorporates at least one of: an analysis of at least one of computer resource failure history, system management policy, and relative probability of occurrence for each fault possibility.

15. The fault management architecture of claim 1 wherein the fault manager stores provided error reports in a log comprising an error report log and wherein the error report log tracks the status of the provided error reports.

16. The fault management architecture of claim 1 wherein the fault manager includes a soft error rate discriminator that:

receives error information concerning correctable errors;

wherein the soft error rate discriminator is configured so that when the number and frequency of correctable errors exceeds a predetermined threshold number of correctable errors over a predetermined threshold amount of time, these errors are deemed recurrent correctable errors that are sent to the diagnostic engines for further analysis;

wherein the diagnostic engine receives a recurrent correctible error message and diagnoses a set of fault possibilities associated with the recurrent correctible error message; and wherein a fault correction agent receives the set of fault possibilities from the diagnostic engines and then resolves the diagnosed fault.

17. The fault management architecture of claim 16 wherein the soft error rate discriminator receives error information concerning correctable errors from the diagnostic engine.

18. The fault management architecture of claim 16 wherein the diagnostic engine that identifies a set of fault possibilities associated with the recurrent correctable error message further determines associated probabilities of occurrence for the set of fault possibilities associated with the recurrent correctable error message.

19. The fault management architecture of claim 18 wherein the a fault correction agent receives the set of fault possibilities and associated probabilities of occurrence from the diagnostic engines and the agent then takes appropriate action to resolve the set of fault possibilities.

20. The fault management architecture of claim 1 wherein the fault manager includes a soft error rate discriminator that:

receives error information concerning soft errors;

wherein the soft error rate discriminator is configured so that when the number and frequency of soft errors exceeds a predetermined threshold number of soft errors over a predetermined threshold amount of time, these soft errors are deemed recurrent soft errors that are sent to the diagnostic engines for further analysis;

wherein the diagnostic engine receives a recurrent soft error message and diagnoses a set of fault possibilities associated with the recurrent correctable error message; and wherein a fault correction agent receives the set of fault possibilities from the diagnostic engines and then resolves the diagnosed fault.

21. The fault management architecture of claim 1 further including a fault management administrative tool that is configured to enable a user to access the logs to determine the fault status and error history of resources in the computer system.

22. The fault management architecture of claim 1 further including a fault management statistical file that can be reviewed to determine the effectiveness of the diagnostic engines and fault correction agents at diagnosing faults and resolving faults.

23. The fault management architecture of claim 1 wherein the computer system comprises a single computer device.

24. The fault management architecture of claim 1 wherein the computer system comprises a plurality of computers forming a network.

\* \* \* \* \*

UNITED STATES PATENT AND TRADEMARK OFFICE
CERTIFICATE OF CORRECTION

PATENT NO. : 7,328,376 B2 Page 1 of 1
APPLICATION NO. : 10/698989
DATED : February 5, 2008
INVENTOR(S) : McGuire et al.

It is certified that error appears in the above-identified patent and that said Letters Patent is hereby corrected as shown below:

On the title page, item (56), under "Other Publications", in column 2, line 1, delete "Wikipeida's" and insert -- Wikipedia's --, therefor.

On the face page, in field (56), under "Other Publications", in column 2, line 5, delete "20003" and insert -- 2003 --, therefor.

In column 3, line 53, delete "programattically" and insert -- programatically --, therefor.

In column 17, line 37, in Claim 19, after "the" delete "a".

Signed and Sealed this

Thirteenth Day of May, 2008

JON W. DUDAS
*Director of the United States Patent and Trademark Office*